United States Patent
Zhou et al.

(10) Patent No.: US 9,462,601 B1
(45) Date of Patent: Oct. 4, 2016

(54) METHOD OF SCHEDULING COMMUNICATION IN A WIRELESS COMMUNICATION NETWORK

(71) Applicant: Sprint Spectrum LP, Overland Park, KS (US)

(72) Inventors: Yu Zhou, Herndon, VA (US); Muhammad Naim, Sterling, VA (US); Shahzada Rasool, Vienna, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 172 days.

(21) Appl. No.: 14/220,832

(22) Filed: Mar. 20, 2014

(51) Int. Cl.
*H04W 72/12* (2009.01)

(52) U.S. Cl.
CPC ................................ *H04W 72/1226* (2013.01)

(58) Field of Classification Search
None
See application file for complete search history.

(56) References Cited

U.S. PATENT DOCUMENTS

| 2010/0081448 A1* | 4/2010 | Wong ................. H04W 72/121 455/452.1 |
| 2010/0144381 A1* | 6/2010 | Park .................... H04W 52/241 455/501 |
| 2013/0003646 A1* | 1/2013 | Michel ............... H04B 7/15592 370/315 |
| 2013/0114455 A1 | 5/2013 | Yoo et al. |
| 2013/0176887 A1 | 7/2013 | Seo et al. |
| 2013/0194982 A1 | 8/2013 | Fwu et al. |

* cited by examiner

*Primary Examiner* — Noel Beharry
*Assistant Examiner* — Wilfred Thomas

(57) ABSTRACT

A system and method of scheduling communication in a wireless communication network are provided. A scheduling scheme comprising a first subframe and a second subframe can be determined to communicate data between a first access node and first wireless devices, and a second access node and second wireless devices. A resource request can be received from one of the first wireless devices. An interference indication can be determined based on the resource request. The first access node can be instructed to communicate with the first wireless devices during the first subframe and the one of the first wireless devices can be instructed to transmit data to the first access node during the second subframe when the interference indication meets an interference criteria. The second access node can be instructed to transmit data addressed to at least one of the second wireless devices during the second subframe.

20 Claims, 6 Drawing Sheets

METHOD OF SCHEDULING COMMUNICATION IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of network configurations can be used to communicate data over the wireless network. For example, a heterogeneous network can be configured to include various types of access nodes such as a macro access node, a micro access node, a pico access node, a femto access node, etc. In a heterogeneous network, a wireless device can be served by an access node having the lowest signal path loss rather than by an access node having the strongest signal strength as in traditional network configurations.

In a heterogeneous network, interference can occur at the cell edge of the short range, low power access nodes due to the macro access node. This interference can result in undesirable reduction in coverage and throughput to the wireless devices in communication with the short range access node. A scheduling scheme comprising almost blank subframes (ABS) can be used to create an opportunity for the wireless devices within the cell edge region of a short range access node to receive downlink information without interference from the macro access node. However, ABS subframes can undesirably limit an amount of resources allocated to wireless devices during each frame.

OVERVIEW

A system and method of scheduling communication in a wireless communication network are provided. A scheduling scheme can be determined to communicate data between a first access node and first wireless devices in communication with the first access node, and a second access node and second wireless devices in communication with the second access node. The scheduling scheme can comprise a first subframe and a second subframe. A resource request can be received from one of the first wireless devices. The resource request can comprise an indication of resources needed to transmit data from the one of the first wireless devices to the first access node. An interference indication of the one of the first wireless devices can be determined based on the resource request. The first access node can be instructed to communicate with the first wireless devices during the first subframe of the scheduling scheme and the one of the first wireless devices can be instructed to transmit data to the first access node during the second subframe when the interference indication of the one of the first wireless devices meets an interference criteria. The second access node can be instructed to communicate with at least one of the second wireless devices that does not meet a signal condition threshold during the first subframe of the scheduling scheme, and to transmit data addressed to at least one of the second wireless devices that meets the signal condition threshold during the second subframe of the scheduling scheme.

DETAILED DESCRIPTION

Figure 1:
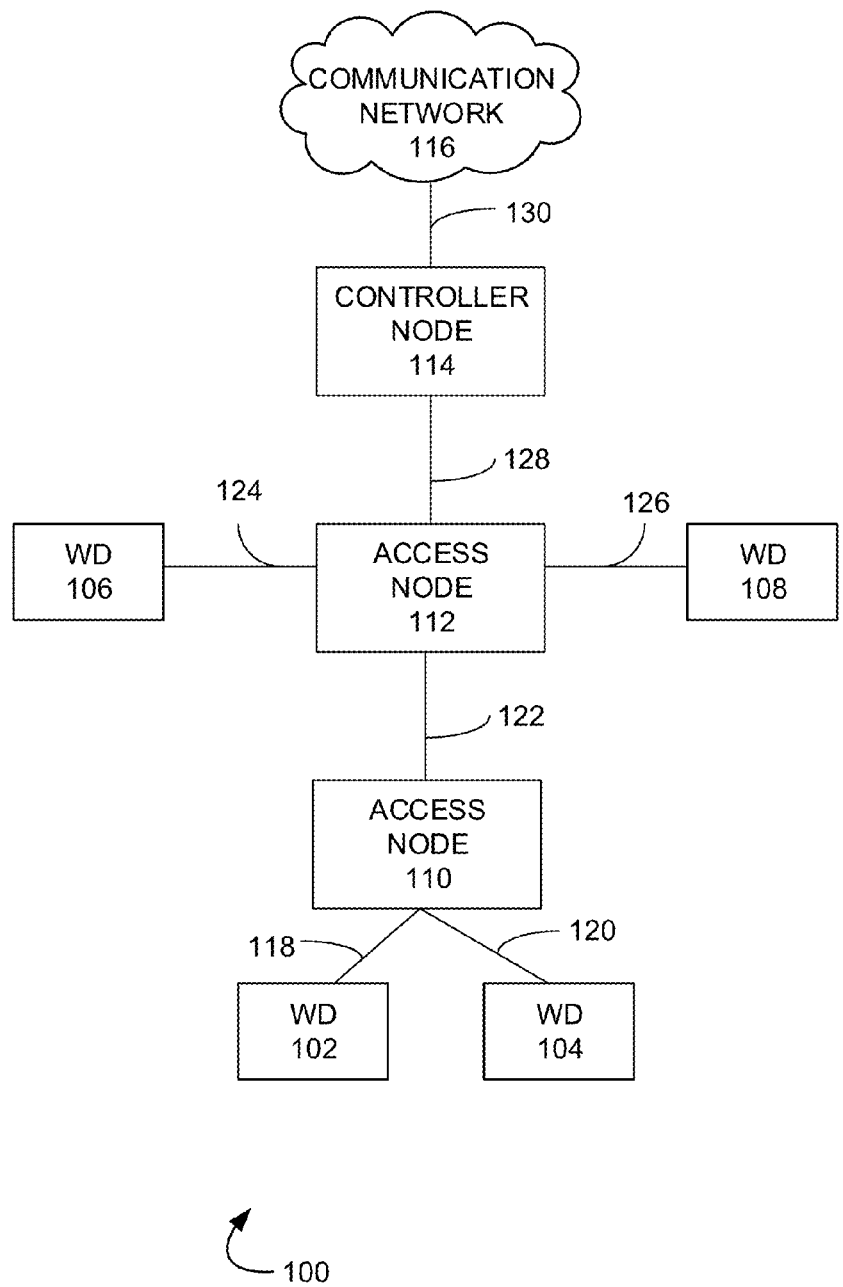
FIG. 1 illustrates a communication system to schedule communications in a wireless communication network.

FIG. 1 illustrates an exemplary communication system 100 for scheduling communication in a wireless communication network. Communication system 100 can comprise wireless devices 102, 104, 106, 108, access nodes 110, 112, controller node 114, and a communication network 116. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 110, 112 and communication network 116, which are omitted for clarity, including additional processing nodes, routers, gateways, and physical and/or wireless data links for carrying data among the various network elements.

Wireless devices 102, 104, 106, 108 can be any device configured to communicate over communication system 100 using a wireless interface. For example, wireless devices 102, 104, 106, 108 can include a remote terminal unit, a cell phone, a smart phone, a computing platform such as a laptop, palmtop, or a tablet, a personal digital assistant, or an internet access device, and combinations thereof. It is noted that while FIG. 1 illustrates two wireless devices in communication with each access node 110, 112 any number of wireless devices can be implemented according to various exemplary embodiments disclosed herein.

The wireless interface of wireless devices 102, 104, 106, 108 can include one or more transceivers for transmitting and receiving data over communication system 100. Each transceiver can be associated with the same or different frequency bands, the same or different radio access technologies, the same or different network providers, and/or the same or different services. For example, wireless devices 102, 104, 106, 108 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 110 through communication link 118. Wireless device 104 can be in communication with access node 110 through communication link 120. Wireless device 106 can be in communication with access node 112 through communication link 124. Wireless device 108 can be in communication with access node 112 through communication link 126. Links 118, 120, 124, 126 can use various communication media, such as air, space, metal, optical fiber, or some other signal propagation path—including combinations thereof. Communication links 118, 120, 124, 126 may comprise many different signals sharing the same link. Communication links 118, 120, 124, 126 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 110 could share the same representative wireless link, but be transferred over different communication sessions, frequencies, timeslots, packets, ports, sockets, logical transport links, or in different directions—including combinations thereof.

Wireless devices 102, 104, 106, 108 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 110, 112 can be any network node configured to provide communication between wireless devices 102, 104, 106, 108 and communication network 116. Access nodes 110, 112 can be standard access nodes and/or short range, low power access nodes. In an exemplary embodiment, access node 110 can be a short range, low power access node within at least a portion of an overlapping coverage area of access node 112, where access node 112 can be a standard access node. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while two access nodes 110, 112 are illustrated in FIG. 1, any number of access nodes can be implemented within system 100.

Access nodes 110, 112 can comprise a processor and associated circuitry to execute or direct the execution of computer-readable instructions to obtain information. Access nodes 110, 112 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 112 can receive instructions and other input at a user interface.

Controller node 114 can be any network node configured to communicate information and/or control information over system 100. For ease of illustration, controller node 114 is shown in FIG. 1 to be in communication with access node 112 through communication link 128. However, one of ordinary skill in the art would recognize that controller node 114 can also be in communication with access node 110. Controller node 114 can be a standalone computing device, computing system, or network component, and can be accessible, for example, by a wired or wireless connection, or through an indirect connection such as through a computer network or communication network. For example, controller node 114 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 114 is not limited to any specific technology architecture, such as Long Term Evolution (LTE) and can be used with any network architecture and/or protocol.

Controller node 114 can comprise a processor and associated circuitry to execute or direct the execution of computer-readable instructions to obtain information. Controller node 114 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 114 can receive instructions and other input at a user interface.

Access node 110 can be in communication with access node 112 through communication link 122. Access node 112 can be in communication with controller node 114 through communication link 128. Controller node 114 can be in communication with communication network 116 through communication link 130. Communication links 122, 128, 130 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 122, 128, 130 can be a direct link or might include various equipment, intermediate components, systems, and networks.

Communication network 116 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 116 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 116 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 116 can also comprise additional base stations, controller nodes, telephony switches, internet routers, network gateways, computer systems, communication links, or some other type of communication equipment, and combinations thereof.

In operation, a network node such as access node 112 or another node within system 100 can determine a scheduling scheme to communicate data between access node 112 and wireless devices 106, 108 and access node 110 and wireless devices 102, 104. The scheduling scheme can comprise a first subframe and a second subframe. The network node can receive a resource request from one of wireless devices 106 or 108. The resource request can comprise an indication of resources needed to transmit data from one of the wireless devices 106 or 108 to access node 112. An interference indication can be determined of one of the wireless devices 106 or 108 based on the resource request. Access node 112 can be instructed to communicate with wireless devices 106 and 108 during the first subframe of the scheduling scheme. One of the wireless devices 106 or 108 (e.g., the wireless device that sent the resource request) can be instructed to transmit data to access node 112 during the second subframe with the interference indication of one of the wireless devices 106 or 108 meets an interference criteria. In addition, access node 112 can be instructed not to communicate with wireless devices 106 and 108 other than the wireless device 106 or 108 (e.g., the at least one wireless device that sent the resource request) during the second subframe when the interference indication meets the interference criteria. Access node 110 can be instructed to communicate with at least one of wireless devices 102 or 104 that does not meet a signal condition threshold during the first subframe of the scheduling scheme. Access node 110 can be further instructed to transmit data addressed to at least one of wireless devices 102 or 104 that meets the signal condition threshold during the second subframe of the scheduling scheme. The signal condition can be indicative of where wireless devices 102 and 104 are located. For example, when wireless device 102 is within the cell coverage of access node 110, wireless device 102 can be determined to not meet the signal condition threshold. When wireless device 104 is within the cell edge of access node 110, wireless device 104 can be determined to meet the signal condition threshold.

Figure 2:
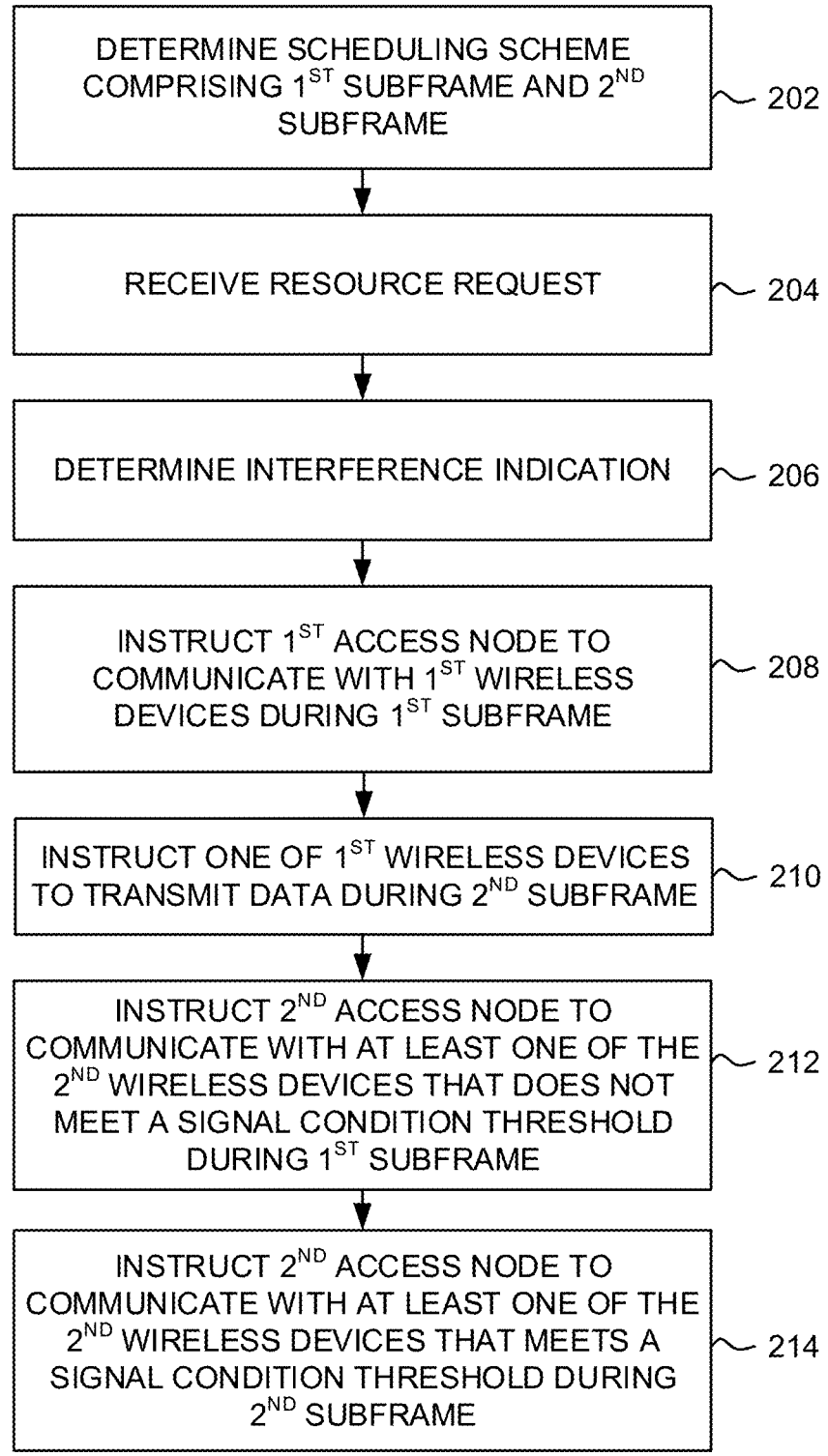
FIG. 2 illustrates an exemplary method of scheduling communication in a wireless communication network.

FIG. 2 illustrates a flow chart of an exemplary method of scheduling communication in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a network node can determine a scheduling scheme comprising a first subframe and a second subframe. For example, access node 112 or another network node can determine the scheduling scheme. The scheduling scheme can be any scheme associated with scheduling or allotting resources for one or more access nodes. In an exemplary embodiment, the scheduling scheme can comprise a plurality of frames and each frame can comprise a plurality of subframes where the plurality of subframes can comprise at least one of a first subframe and at least one of a second subframe. The number of first subframes and second subframes determined within the scheduling scheme can be based on various factors such as an amount of information to be transmitted from an access node to wireless devices in communication with the access node, an amount of information to be transmitted from a wireless device to an access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul of system 100, a throughput of each network node, a processing load at each network node, and any delay associated with each network node.

In an exemplary embodiment, the scheduling scheme can be determined based on data to be communicated between a first access node, such as access node 112 and first wireless devices 106, 108 in communication with access node 112 and a second access node, such as access node 110 and second wireless devices 102, 104 in communication with access node 110. A number of first subframes and second subframes can be based on data to be communicated between the wireless devices 106, 108 and access node 112, data to be communicated between wireless devices 102, 104 and access node 110, an application requirement of an application running on at least one of wireless devices 106, 108, and an application requirement of an application running on at least one of wireless devices 102, 104. The number of first and second subframes can be further based on a load at access node 112 and a load at access node 110. In an exemplary embodiment, the scheduling scheme can be determined based on uplink and/or downlink communications between access nodes 110, 112 and wireless devices 102, 104, 106, 108, respectively.

In an exemplary embodiment, the scheduling scheme can be selected from a plurality of predetermined scheduling schemes where each of the predetermined scheduling schemes comprises different configurations of the first subframe and the second subframe. In an exemplary embodiment, one of the predetermined scheduling schemes can be selected from one of the predetermined scheduling schemes defined in the LTE standard where the number of uplink and downlink subframes are predetermined as well as the subframe configuration. For example, configuration 1 in LTE TDD can comprise a subframe configuration of DSUUDDSUUD where D corresponds to a downlink subframe, U corresponds to an uplink subframe, and S corresponds to a special subframe reserved for periodicity switching between a downlink and uplink subframe.

Alternatively, the scheduling scheme can be dynamically determined where the subframe configuration and number of uplink and downlink subframes are determined based on various factors such as an amount of data addressed to wireless devices in communication with each access node, an amount of data to be transmitted from each wireless device, a load on each access node, a load on the network, an application requirement of an application running on each wireless device, etc.

In another exemplary embodiment, the scheduling scheme can be communicated to wireless devices in communication with the access nodes over a physical broadcast channel. For example, since the scheduling scheme is dynamically adjusted it cannot be transmitted over the regular SIB2 channel because the periodicity is too large (e.g., 80 ms). Therefore, the scheduling scheme can be transmitted from access nodes 110, 112 over the respective physical broadcast channels such that the wireless devices 102, 104, 106, 108 can receive the updates and adjust the uplink and downlink transmissions accordingly.

A network node can receive a resource request from one of the first wireless devices at 204. For example, access node 112 or another network node can receive a resource request from one of wireless devices 106, 108. The resource request can comprise an indication of resources needed to transmit data from one of the first wireless devices to the first access node. In an exemplary embodiment, the resource request can be a request for resources to transmit data from one of wireless devices 106, 108 to access node 112. The resource request can further comprise an indication of a signal characteristic associated with the one of the first wireless devices. A signal characteristic can be based on a signal quality and/or signal strength. For example, the signal characteristic can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR).

At 206, an interference indication can be determined. For example, an interference indication can be determined for the one of the wireless devices 106, 108 based on the resource request. The interference indication can be based on various factors including signal conditions between the one of the wireless devices 106, 108 and access node 112, signal conditions between the one of the wireless devices 106, 108 and access node 110, a location of one of the wireless devices 106, 108 with respect access node 112 and/or access node 110, interference detected at the one of the wireless devices 106, 108 based on transmissions from access node 110, etc. In an exemplary embodiment, the interference indication can be determined based on signal characteristics comprised within the resource request.

The first access node can be instructed to communicate with the first wireless devices during the first subframe of the scheduling scheme at 208. For example, access node 112 can be instructed to communicate with wireless devices during the first subframe of the scheduling scheme. In an exemplary embodiment, uplink and/or downlink transmissions can be communicated between all wireless devices in communication with access node 112 during the first subframe of the scheduling scheme.

At 210, the one of the first wireless devices can be instructed to transmit data to the first access node during the second subframe when the interference indication of the one of the first wireless devices meets an interference criteria. For example, the wireless device that sent the resource request can be instructed to transmit uplink communication to access node 112 during the second subframe of the scheduling scheme when the interference indication meets the interference criteria. The interference criteria can be indicative of an amount of interference that the wireless device will experience based on access node 110. For example, when the wireless device is closer to access node 110 the interference can be greater than when the wireless device is further away from access node 110. When it is determined that the interference indication meets the interference criteria it can be indicative of a minimal amount of interference such that it will not result in an undesirable reduction in coverage, a signal quality, and/or throughput to the wireless device in communication with access node 112. When the interference indication exceeds the interference criteria, it can be indicative of an amount of interference that results in a reduction of coverage, signal quality, and/or throughput to the wireless device. In addition, access node 112 can be further instructed to not communicate with any other wireless device during the second subframe except the wireless device that sent the resource request when the interference indication meets the interference criteria.

It is noted that a resource request can be received for data addressed to a plurality of wireless devices in communication with the access node. An interference indication can be determined for each resource request. The access node can be instructed to transmit the data addressed to each wireless device that meets the interference criteria during the second subframe of the scheduling scheme. Therefore, the access node can transmit data addressed to a plurality of wireless devices when the interference indication of each wireless device meets the interference criteria.

The second access node can be instructed to communicate with at least one of the second wireless devices that does not meet a signal condition threshold during the first subframe at 212 and to communicate with at least one of the second wireless devices that meets a signal condition threshold during the second subframe at 214. Whether or not a second wireless device meets a signal condition threshold can be based on a signal quality and/or signal condition between each of the second wireless devices 102, 104 and access node 110. For example, the signal quality and/or signal condition can be based on a signal characteristic of at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR). When the signal characteristic is determined to meet the signal condition threshold, the wireless device can be determined to be within the cell edge of access node 110. When the signal characteristic is determined not meet the signal condition threshold, the wireless device can be determined to not be within the cell edge of the access node 110.

In an exemplary embodiment, access node 112 can be a macro access node and access node 110 can be at least one of a micro access node, a pico access node, and a femto access node.

Figure 3:
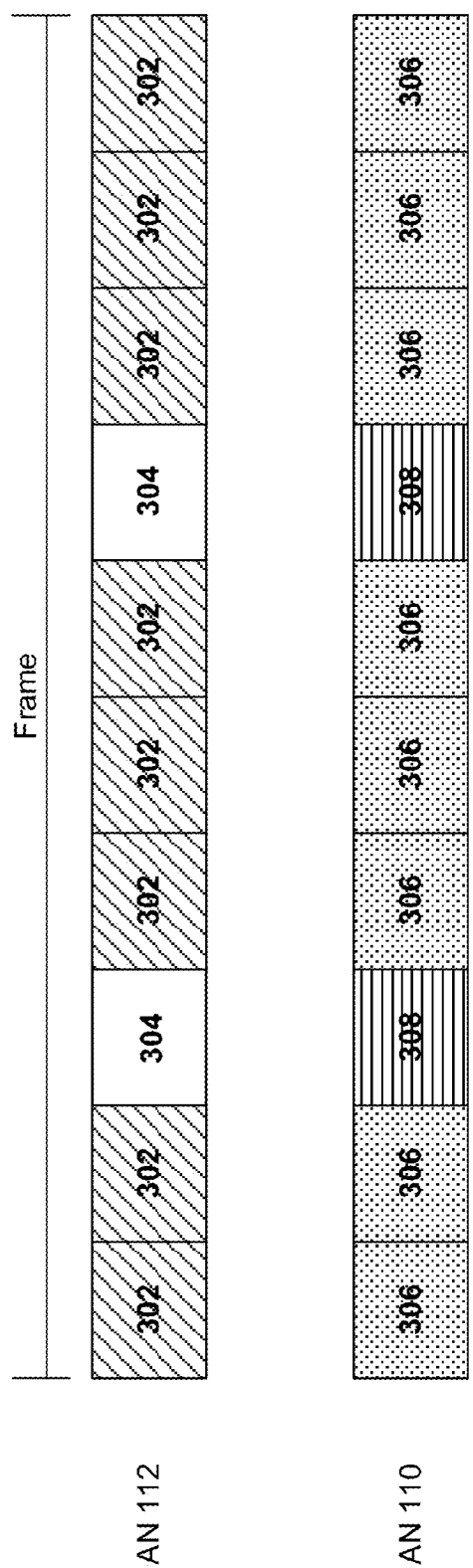
FIG. 3 illustrates an exemplary scheduling scheme for scheduling communication in a wireless communication network.

FIG. 3 illustrates an exemplary scheduling scheme for scheduling communication in a network. The scheduling scheme can comprise a frame having a plurality of subframes. The pattern of the subframes can be based on various factors including the amount of information to be transmitted between wireless devices and each access node, a load on each access node, a load on the network, an application requirement of an application running on a wireless device in communication with an access node, etc. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul, a throughput of each network node, a processing load at each network node, and any delay associated with each network node. For example, the scheduling scheme associated with access node 112 can comprise subframes 302 in which access node 112 can communicate uplink and/or downlink data with wireless devices 106, 108. Access node 112 can receive data transmitted from a wireless device that sent a resource request and met an interference criteria such as wireless device 106 or 108. During subframes 304, access node 112 can receive uplink data from the wireless device. In addition, access node 112 can refrain from communicating with any wireless device that does not meet the interference criteria.

In addition, during the scheduling scheme, access node 110 can communicate with wireless devices that do not meet a signal condition threshold (e.g., located within the cell center of access node 110) during subframes 306. During subframes 308, access node 110 can communicate data to wireless devices that meet the signal condition threshold (e.g., located within the cell edge of access node 110).

It is noted that while two subframes 304 are illustrated in FIG. 3, any number of subframes 304 can be included in the scheduling scheme. For example, when the resource request indicates that an amount of data to be transmitted from the at least one of the wireless devices 106, 108 is below a threshold, the amount of data to be communicated between the other wireless devices and access node 112 exceeds a threshold, and/or an amount of information to be communicated to wireless devices determined to be in the cell edge of access node 110 is below a threshold, the number of subframes 304 can be reduced. When the amount of data to be transmitted from the at least one of the wireless devices 106, 108 exceeds a threshold, the amount of data to be communicated between the other wireless devices and access node 112 is below a threshold, and/or an amount of information to be communicated to wireless devices determined to be in the cell edge of access node 110 exceeds a threshold, the number of subframes 304 can be increased.

Figure 4:
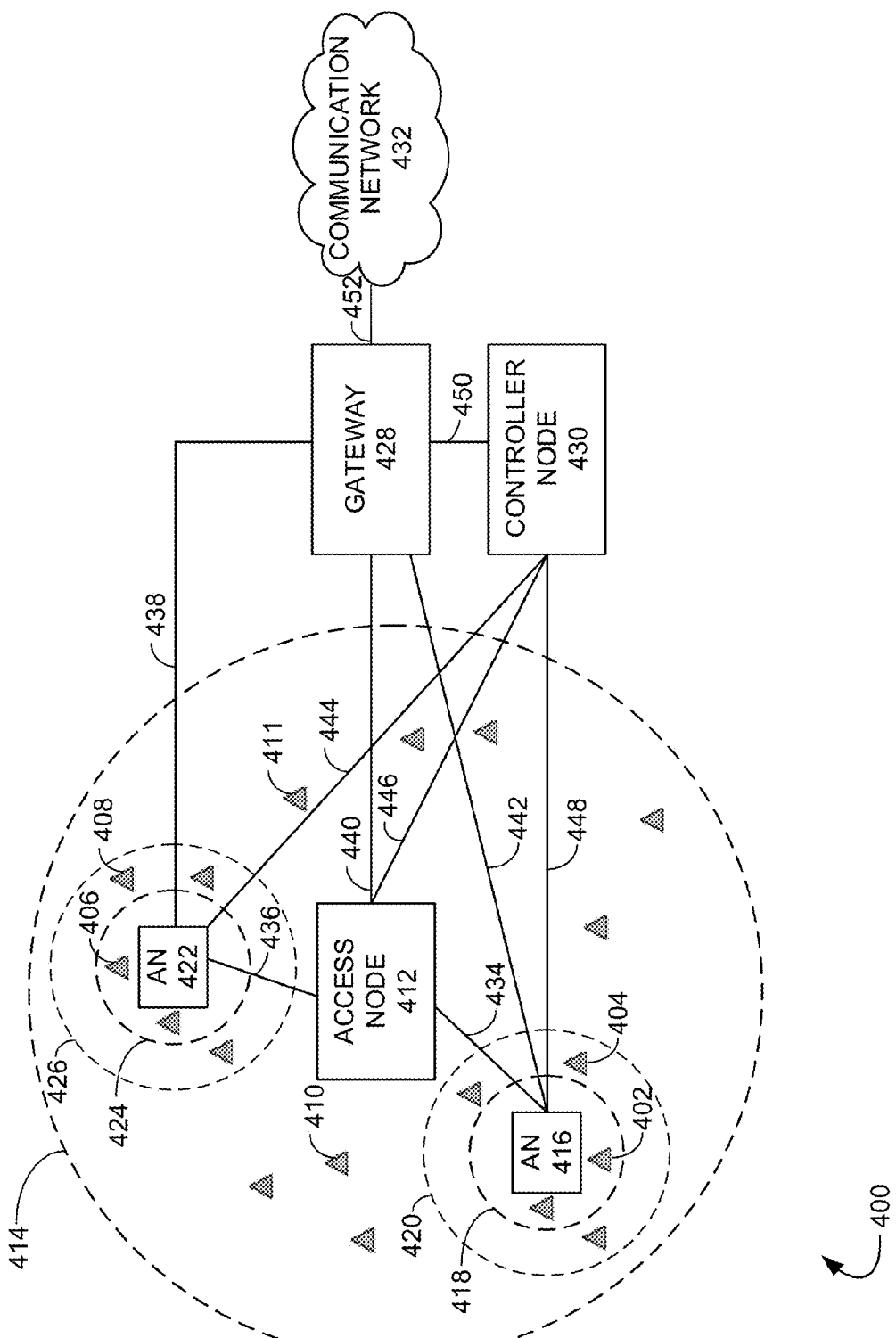
FIG. 4 illustrates another communication system to schedule communications in a wireless communication network.

FIG. 4 illustrates an exemplary communication system 400 for scheduling communication in a wireless communication network. Communication system 400 can comprise wireless devices 402, 404, 406, 408, 410, access nodes 412, 416, 422, gateway 428, controller node 430, and communication network 432. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 412, 416, 422 and communication network 432, which are omitted for clarity, including additional processing nodes, routers, gateways, and physical and/or wireless data links for carrying data among the various network elements.

Wireless devices 402, 404, 406, 408, 410 can be any device configured to communicate over communication system 400 using a wireless interface. For example, wireless devices 402, 404, 406, 408, 410 can include a remote terminal unit, a cell phone, a smart phone, a computing platform such as a laptop, palmtop, or a tablet, a personal digital assistant, or an internet access device, and combinations thereof.

The wireless interface of wireless devices 402, 404, 406, 408, 410 can include one or more transceivers for transmitting and receiving data over communication system 400. Each transceiver can be associated with the same or different frequency bands, the same or different radio access technologies, the same or different network providers, and/or the same or different services. For example, wireless devices 402, 404, 406, 408, 410 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

While not illustrated in FIG. 4 for clarity, wireless devices 402, 404 can be in communication with access node 416 through communication links. Wireless devices 406, 408 can be in communication with access node 422 through communication links. Wireless devices 410 can be in communication with access node 412 through communication links. The communication links can use various communication media, such as air, space, metal, optical fiber, or some other signal propagation path—including combinations thereof. The communication links may comprise many different signals sharing the same link. The communication links could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 402 and access node 416 could share the same representative wireless link, but be transferred over different communication sessions, frequencies, timeslots, packets, ports, sockets, logical transport links, or in different directions—including combinations thereof.

Wireless devices 402, 404, 406, 408, 410 can transmit and/or receive information over system 400 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 412, 416, 422 can be any network node configured to provide communication between wireless devices 402, 404, 406, 408, 410 and communication network 432. Access nodes 412, 416, 422 can be standard access nodes or short range, low power access nodes. In an exemplary embodiment, access node 412 can be a standard access node having a coverage area 414. Access node 416 can be short range, low power access node having a coverage area of 420 and access node 422 can be a short range, low power access node having a coverage area of 426. Access nodes 416, 422 can be within at least a portion of an overlapping coverage area 414 of access node 412 where each access node 416, 422 has a coverage area that includes a cell edge portion between the full strength coverage area 418, 424 and the edge of the cell coverage area 420, 426.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while three access nodes 412, 416, 422 are illustrated in FIG. 4, any number of access nodes can be implemented within system 400.

Access nodes 412, 416, 422 can comprise a processor and associated circuitry to execute or direct the execution of computer-readable instructions to obtain information. Access nodes 412, 416, 422 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 412, 416, 422 can receive instructions and other input at a user interface.

Gateway 428 can be any network node configured to interface with other network nodes using various protocols. Gateway 428 can communicate user data over system 400. Gateway 428 can be a standalone computing device, computing system, or network component, and can be accessible, for example, by a wired or wireless connection, or through an indirect connection such as through a computer network or communication network. For example, gateway 428 can include a serving gateway (SGW) and/or a public data network gateway (PGW), etc. One of ordinary skill in the art would recognize that gateway 428 is not limited to any specific technology architecture, such as Long Term Evolution (LTE) and can be used with any network architecture and/or protocol.

Gateway 428 can comprise a processor and associated circuitry to execute or direct the execution of computer-readable instructions to obtain information. Gateway 428 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 428 can receive instructions and other input at a user interface.

Controller node 430 can be any network node configured to communicate information and/or control information over system 400. Controller node 430 can be configured to transmit control information associated with a handover procedure. Controller node 430 can be a standalone computing device, computing system, or network component, and can be accessible, for example, by a wired or wireless connection, or through an indirect connection such as through a computer network or communication network. For example, controller node 430 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 430 is not limited to any specific technology architecture, such as Long Term Evolution (LTE) and can be used with any network architecture and/or protocol.

Controller node 430 can comprise a processor and associated circuitry to execute or direct the execution of computer-readable instructions to obtain information. Controller node 430 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 430 can receive instructions and other input at a user interface.

Access node 412 can be in communication with access node 416 through communication link 434. Access node 412 can be in communication with access node 422 through communication link 436. Access node 422 can be in communication with gateway 428 through communication link 438. Access node 412 can be in communication with gateway 428 through communication link 440. Access node 416 can be in communication with gateway 428 through communication link 442. Access node 422 can be in communication with controller node 430 through communication link 444. Access node 412 can be in communication with controller node 430 through communication link 446. Access node 416 can be in communication with controller node 430 through communication link 448. Gateway 428 can be in communication with controller node 430 through communication link 450 and with communication network 432 through communication link 452. Communication links 434, 436, 438, 440, 442, 444, 446, 448, 450, 452 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 434, 436, 438, 440, 442, 444, 446, 448, 450, 452 can be a direct link or might include various equipment, intermediate components, systems, and networks.

Communication network 432 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 432 can be capable of carrying data, for example, to support voice, push-to-talk, broadcast video, and data communications by a wireless device such as wireless device 402. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 432 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 432 can also comprise additional base stations, controller nodes, telephony switches, internet routers, network gateways, computer systems, communication links, or some other type of communication equipment, and combinations thereof.

In operation, a network node such as access node 412 and/or controller node 430 can determine a scheduling scheme to communicate data between a first access node such as access node 412 and first wireless devices, such as wireless devices 410, 411, in communication with access node 412, a second access node, such as access node 416, and second wireless devices, such as wireless devices 402, 404, in communication with access node 416, and a third access node, such as access node 422, and third wireless devices, such as wireless devices 406, 408, in communication with access node 422. The scheduling scheme can comprise a first subframe and a second subframe. The scheduling scheme can be communicated from access nodes 412, 416, and/or 422 to wireless devices 402, 404, 406, 408, 410, 411 over a physical broadcast channel. A resource request can be received from one of the wireless devices, such as wireless device 411, in communication with access node 412. The resource request can comprise an indication of resources needed to transmit data from wireless device 411 to access node 412. An interference indication of wireless device 411 can be determined based on the resource request. Access node 412 can be instructed to communicate with wireless devices 410 during the first subframe of the scheduling scheme. Wireless device 411 can be instructed to transmit data to access node 412 during the second subframe when the interference indication of wireless device 411 meets an interference criteria. In addition, access node 412 can be instructed not to communicate with wireless devices 410 during the second subframe of the scheduling scheme when the interference indication of wireless device 411 meets the interference criteria. Access node 416 can be instructed to communicate with wireless devices that do not meet a signal condition threshold, such as wireless devices 402, during the first subframe of the scheduling scheme, and to transmit data addressed to wireless devices that meet the signal condition threshold, such as wireless devices 404, during the second subframe. Access node 422 can be instructed to communicate with wireless devices that do not meet a signal condition threshold, such as wireless devices 406, during the first subframe of the scheduling scheme, and to transmit data addressed to wireless devices that meet the signal condition threshold, such as wireless devices 408, during the second subframe of the scheduling scheme. Access node 412 can receive a message from at least one of access nodes 416, 422 indicative of the data addressed to wireless devices 404, 408 during the second subframe of the scheduling scheme. Access node 412 can decode the data transmitted from wireless device 411 to access node 412 during the second subframe based on the data indicative of the data addressed to wireless devices 404 and/or 408 and the interference indication.

Figure 5:
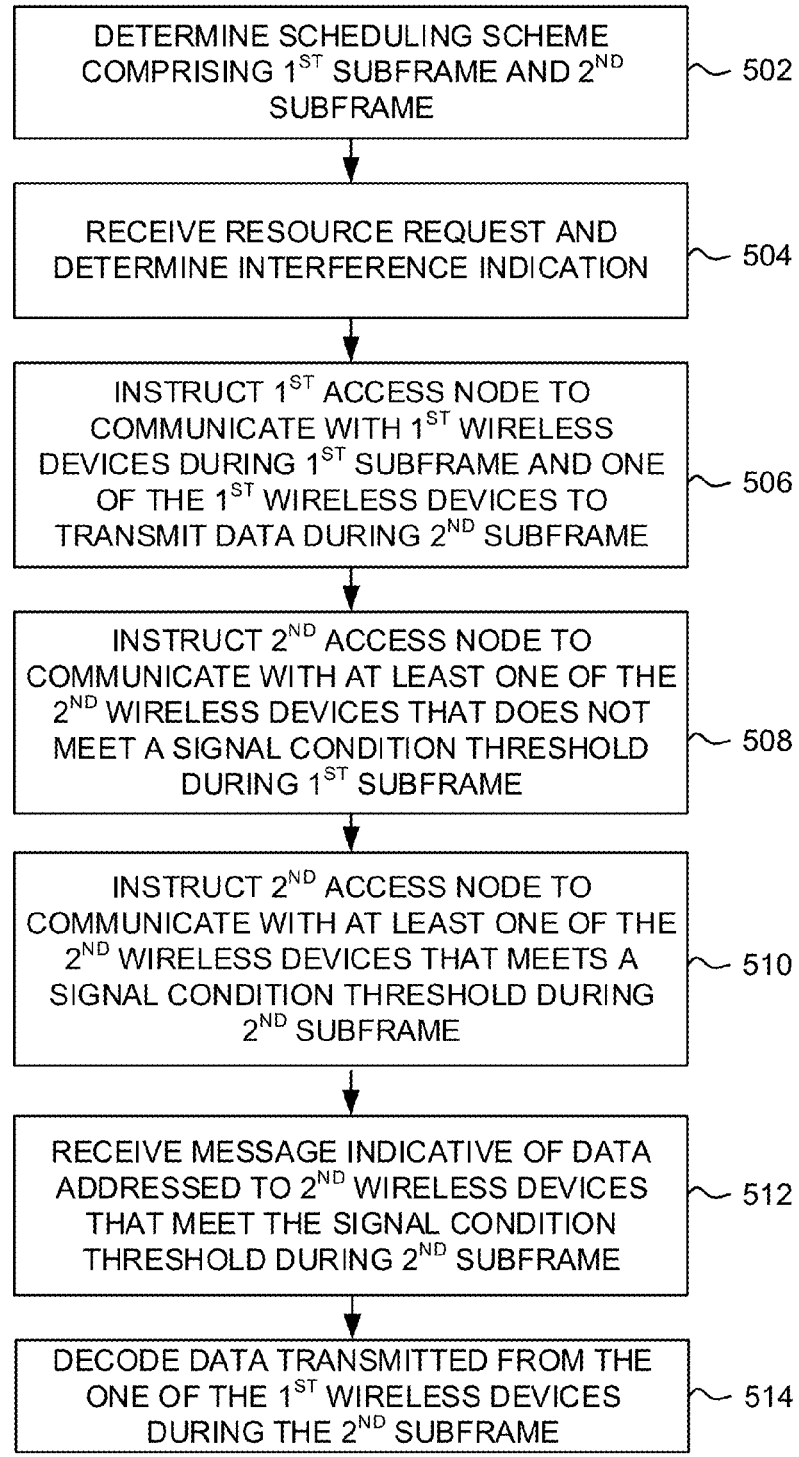
FIG. 5 illustrates another exemplary method of scheduling communication in a wireless communication network.

FIG. 5 illustrates a flow chart of an exemplary method of scheduling communication in a wireless communication network. The method will be discussed with reference to the exemplary communication system 400 illustrated in FIG. 4. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 502, a network node can determine a scheduling scheme comprising a first subframe and a second subframe. For example, access node 412, controller node 430, and/or another network node can determine the scheduling scheme. The scheduling scheme can be any scheme associated with scheduling or allotting resources for one or more access nodes such as access nodes 412, 416, 422. In an exemplary embodiment, the scheduling scheme can comprise a plurality of frames and each frame can comprise a plurality of subframes where the plurality of subframes can comprise at least one of a first subframe and at least one of a second subframe. The number of first subframes and second subframes determined within the scheduling scheme can be based on various factors such as an amount of information to be transmitted from each access node to wireless devices in communication with each access node, an amount of information to be transmitted from a wireless device to an access node, a load on each access node, a load on the network, and an application requirement of an application running on a wireless device in communication with an access node, etc. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul of system 400, a throughput of each network node, a processing load at each network node, and any delay associated with each network node.

In an exemplary embodiment, the scheduling scheme can be determined based on data to be communicated between access node 412 and wireless devices 410, 411, data to be communicated between access node 416 and wireless devices 402, 404, and data to be communicated between access node 422 and wireless devices 406, 408. A number of first subframes and second subframes can be based on data to be communicated between each access node 412, 416, 422 and wireless devices 402, 404, 406, 408, 410, 411, an application requirement of an application running on at least one of wireless devices 402, 404, 406, 408, 410, 411. The number of first and second subframes can be further based on a load at access nodes 412, 416, 422. In an exemplary embodiment, the scheduling scheme can be determined based on uplink and/or downlink communications between access nodes 412, 416, 422 and wireless devices 402, 404, 406, 408, 410, 411, respectively.

In an exemplary embodiment, the scheduling scheme can be selected from a plurality of predetermined scheduling schemes where each of the predetermined scheduling schemes comprises different configurations of the first subframe and the second subframe. For example, one of the predetermined scheduling schemes can be selected from one of the predetermined scheduling schemes defined in the LTE standard where the number of uplink and downlink subframes is predetermined as well as the subframe configuration. Alternatively, the scheduling scheme can be dynamically determined where the subframe configuration and number of uplink and downlink subframes are determined based on various factors such as an amount of data addressed to wireless devices in communication with each access node, an amount of data to be transmitted from each wireless device, a load on each access node, a load on the network, an application requirement of an application running on each wireless device, etc.

In another exemplary embodiment, the scheduling scheme can be communicated to wireless devices in communication with the access nodes over a physical broadcast channel. For example, since the scheduling scheme is dynamically adjusted it cannot be transmitted over the regular SIB2 channel because the periodicity is too large (e.g., 80 ms). Therefore, the scheduling scheme can be transmitted from access nodes 412, 416, 422 over the respective physical broadcast channels such that the wireless devices 402, 404, 406, 408, 410, 411 can receive the updates and adjust the uplink and downlink transmissions accordingly.

A network node can receive a resource request from one of the first wireless devices and determine an interference indication at 504. For example, access node 412 or another network node can receive a resource request from one of wireless devices 410, 411. The resource request can comprise an indication of resources needed to transmit data from one of the wireless devices 410, 411 to access node 412. The resource request can further comprise an indication of a signal characteristic associated with the one of the first wireless devices. A signal characteristic can be based on a signal quality and/or signal strength. For example, the signal characteristic can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). The interference indication can be determined for the one of the wireless devices 410, 411 based on the resource request. The interference indication can be based on various factors including signal conditions between the one of the wireless devices 410, 411 and access node 412, signal conditions between the one of the wireless devices 402, 404, 406, 408 and access nodes 416, 422, a location of one of the wireless devices 410, 411 with respect access nodes 412, 416, and/or 422, interference detected at the one of the wireless devices 410, 411 based on transmissions from access nodes 416, 422, etc. In an exemplary embodiment, the interference indication can be determined based on signal characteristics comprised within the resource request.

The first access node can be instructed to communicate with the first wireless devices during the first subframe of the scheduling scheme and one of the first wireless devices can be instructed to transmit data during the second subframe at 506. For example, access node 412 can be instructed to communicate with wireless devices 410, 411 during the first subframe of the scheduling scheme. In an exemplary embodiment, uplink and/or downlink transmissions can be communicated between all wireless devices 410, 411 in communication with access node 412 during the first subframe of the scheduling scheme. One of the first wireless devices 410, 411 can be instructed to transmit data to access node 412 during the second subframe when the interference indication of the one of the first wireless devices 410, 411 meets an interference criteria. For example, the wireless device that sent the resource request can be instructed to transmit uplink communication to access node 412 during the second subframe of the scheduling scheme. The interference criteria can be indicative of an amount of interference that the wireless device will experience based on access nodes 416 and/or 422. For example, when the wireless device is closer to access nodes 416, 422 the interference can be greater than when the wireless device is further away from access nodes 416, 422. When it is determined that the interference indication meets the interference criteria it can be indicative of a minimal amount of interference such that it will not result in an undesirable reduction in coverage, a signal quality, and/or throughput to the wireless device in communication with access node 412. When the interference indication exceeds the interference criteria, it can be indicative of an amount of interference that results in a reduction of coverage, signal quality, and/or throughput to the wireless device. In addition, access node 412 can be further instructed to not communicate with any other wireless device during the second subframe except the wireless device that sent the resource request when the interference indication does not meet the interference criteria.

The second access node can be instructed to communicate with at least one of the second wireless devices that does not meet a signal condition threshold during the first subframe at 508 and to communicate with at least one of the second wireless devices that meets a signal condition threshold during the second subframe at 510. Whether or not a second wireless device meets a signal condition threshold can be based on a signal quality and/or signal condition between each of the second wireless devices 402, 404, 406, 408 and access nodes 416, 422. For example, access nodes 416 and/or 422 can be instructed to communicate with wireless devices 402, 406 during the first subframe and access nodes 416 and/or 422 can be instructed to communicate with wireless devices 404, 408 during the second subframe. The signal quality and/or signal condition can be based on a signal characteristic of at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). When the signal characteristic is determined to meet the signal condition threshold, the wireless device 404, 408 can be determined to be within the cell edge of access nodes 416, 422. When the signal characteristic is determined not meet the signal condition threshold, the wireless device 402, 406 can be determined to not be within the cell edge of the access nodes 416, 422.

In an exemplary embodiment, access node 412 can be a macro access node and access nodes 416, 422 can be at least one of a micro access node, a pico access node, and a femto access node.

At 512, a message indicative of data addressed to the second wireless devices that meet the signal condition threshold during the second subframe can be received. For example, access nodes 416 and/or 422 can transmit a message indicative of data transmitted to wireless devices 404 and/or 408 during the second subframe. The message can be sent over various communication links such as a wireless communication link between access node 416 or 422 and access node 412 or over a wired communication link such as an X2 communication link between access node 416 or 422 and access node 412.

A network node can decode the data transmitted from one of the first wireless devices during the second subframe at 514. For example, access node 412 or another network node such as controller node 430, etc., can decode the data transmitted from one of the first wireless devices 410, 411 during the second subframe based on the message indicative of the data addressed to the second wireless devices that meet the signal condition threshold during the second subframe. In an exemplary embodiment, access nodes 416 and/or 422 can send the content sent to wireless devices 404 and/or 408 during the second subframe using an X2 interface. Based on the received content and the interference indication, access node 412 can decode the original content of the uplink transmission sent from wireless device 410, 411 during the second subframe.

Figure 6:
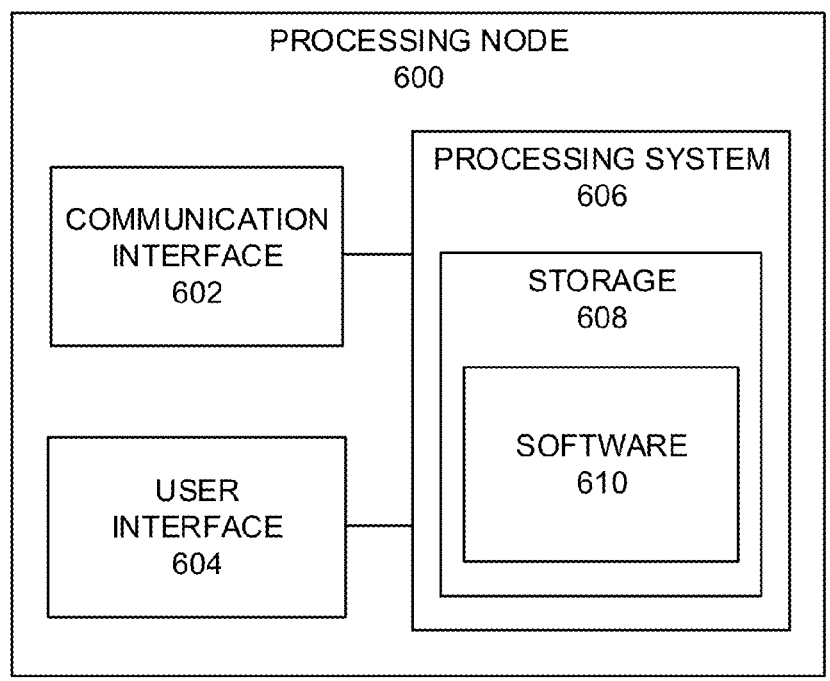
FIG. 6 illustrates a processing node according to an exemplary embodiment.

FIG. 6 illustrates an exemplary processing node 600 in a communication system. Processing node 600 comprises communication interface 602, user interface 604, and processing system 606 in communication with communication interface 602 and user interface 604. Processing node 600 is capable of monitoring communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 110, 112, 412, 416, 422, controller nodes 114, 430, and gateway 428. Processing node 600 can also be an adjunct or component of a network element, such as an element of access nodes 110, 112, 412, 416, 422, controller nodes 114, 430, and gateway 428. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling communication in a wireless communication network, comprising:
   determining a scheduling scheme to communicate data between a first access node and first wireless devices in communication with the first access node, and a second access node and second wireless devices in communication with the second access node, wherein the scheduling scheme comprises a first subframe and a second subframe;
   receiving a resource request from one of the first wireless devices, wherein the resource request comprises an indication of resources needed to transmit data from the one of the first wireless devices to the first access node;
   determining an interference indication of the one of the first wireless devices based on the resource request;
   instructing the first access node to communicate with the first wireless devices during the first subframe of the scheduling scheme and instructing the one of the first wireless devices to transmit data to the first access node during the second subframe when the interference indication of the one of the first wireless devices meets an interference criteria; and
   instructing the second access node to communicate with at least one of the second wireless devices that does not meet a signal condition threshold during the first subframe of the scheduling scheme, and to transmit data addressed to at least one of the second wireless devices that meets the signal condition threshold during the second subframe of the scheduling scheme.

2. The method of claim 1, further comprising:
instructing the first access node not to communicate with the first wireless devices other than the one of the first wireless devices during the second subframe when the interference indication meets the interference criteria.

3. The method of claim 1, wherein the scheduling scheme is selected from a plurality of predetermined scheduling schemes and each of the predetermined scheduling schemes comprises different configurations of the first subframe and the second subframe.

4. The method of claim 1, wherein the resource request further comprises an indication of a signal characteristic associated with the one of the first wireless devices.

5. The method of claim 1, wherein the scheduling scheme is communicated to the first wireless devices in communication with the first access node and the second wireless devices in communication with the second access node over a physical broadcast channel.

6. The method of claim 1, further comprising:
receiving at the first access node a message from the second access node indicative of the data addressed to the at least one of the second wireless devices that meets the signal condition threshold during the second subframe of the scheduling scheme; and
decoding at the first access node the data transmitted from the one of the first wireless devices to the first access node during the second subframe based on the data indicative of the data addressed to the at least one of the second wireless devices that meets the signal condition threshold and the interference indication.

7. The method of claim 1, wherein the scheduling scheme comprises a plurality of first subframes and second subframes and a number of second subframes is based on data to be communicated between the first wireless devices and the first access node, data to be communicated between the second wireless devices and the second access node, an application requirement of an application running on at least one of the first wireless devices, and an application requirement of an application running on at least one of the second wireless devices.

8. The method of claim 7, wherein the number of second subframes is further based on a load at the first access node and a load at the second access node.

9. The method of claim 1, wherein the at least one of the second wireless devices that meets the signal condition threshold are determined to be in a cell edge region of the second access node.

10. The method of claim 1, wherein the first access node comprises a macro access node and the second access node comprises at least one of a micro access node, a pico access node, and a femto access node.

11. A system for scheduling communication in a wireless communication network, comprising:
a processing node configured to
determine a scheduling scheme to communicate data between a first access node and first wireless devices in communication with the first access node, and a second access node and second wireless devices in communication with the second access node, wherein the scheduling scheme comprises a first subframe and a second subframe,
receive a resource request from one of the first wireless devices, wherein the resource request comprises an indication of resources needed to transmit data from the one of the first wireless devices to the first access node,
determine an interference indication of the one of the first wireless devices based on the resource request,
instruct the first access node to communicate with the first wireless devices during the first subframe of the scheduling scheme and instruct the one of the first wireless devices to transmit data to the first access node during the second subframe when the interference indication of the one of the first wireless devices meets an interference criteria, and
instruct the second access node to communicate with at least one of the second wireless devices that does not meet a signal condition threshold during the first subframe of the scheduling scheme, and to transmit data addressed to at least one of the second wireless devices that meets the signal condition threshold during the second subframe of the scheduling scheme.

12. The system of claim 11, wherein the processing node is further configured to instruct the first access node not communicate with the first wireless devices other than the one of the first wireless devices during the second subframe when the interference indication does not meet the interference criteria.

13. The system of claim 11, wherein the scheduling scheme is selected from a plurality of predetermined scheduling schemes and each of the predetermined scheduling schemes comprises different configurations of the first subframe and the second subframe.

14. The system of claim 11, wherein the resource request further comprises an indication of a signal characteristic associated with the one of the first wireless devices.

15. The system of claim 11, wherein the scheduling scheme is communicated to the first wireless devices in communication with the first access node and the second wireless devices in communication with the second access node over a physical broadcast channel.

16. The system of claim 11, wherein the processing node is further configured to
receive a message from the second access node indicative of the data addressed to the at least one of the second wireless devices that meets the signal condition threshold during the second subframe of the scheduling scheme, and
decode the data transmitted from the one of the first wireless devices to the first access node during the second subframe based on the data indicative of the data addressed to the at least one of the second wireless devices that meets the signal condition threshold and the interference indication.

17. The system of claim 11, wherein the scheduling scheme comprises a plurality of first subframes and second subframes and a number of second subframes is based on data to be communicated between the first wireless devices and the first access node, data to be communicated between the second wireless devices and the second access node, an application requirement of an application running on at least one of the first wireless devices, and an application requirement of an application running on at least one of the second wireless devices.

18. The system of claim 17, wherein the number of second subframes is further based on a load at the first access node and a load at the second access node.

19. The system of claim 11, wherein the at least one of the second wireless devices that meets the signal condition threshold are determined to be in a cell edge region of the second access node.

20. The system of claim 11, wherein the first access node comprises a macro access node and the second access node comprises at least one of a micro access node, a pico access node, and a femto access node.

* * * * *